US007366679B2

(12) United States Patent
Yuyama et al.

(10) Patent No.: US 7,366,679 B2
(45) Date of Patent: Apr. 29, 2008

(54) RESIDUAL VALUE FORECASTING SYSTEM AND METHOD THEREOF, INSURANCE PREMIUM CALCULATION SYSTEM AND METHOD THEREOF, AND COMPUTER PROGRAM PRODUCT

(75) Inventors: Takuya Yuyama, Nagoya (JP);
Takanori Sakai, Nagoya (JP); Kenji Ino, Tokyo (JP); Shumpei Okada, Tokyo (JP)

(73) Assignees: Proto Corporation, Aichi (JP); The Tokio Marine & Fire Insurance Co., Ltd., Tokyo (JP)

( * ) Notice: Subject to any disclaimer, the term of this patent is extended or adjusted under 35 U.S.C. 154(b) by 816 days.

(21) Appl. No.: 09/983,441

(22) Filed: Oct. 24, 2001

(65) Prior Publication Data
US 2002/0072958 A1  Jun. 13, 2002

(30) Foreign Application Priority Data
Oct. 31, 2000  (JP)  ........................... 2000-332475

(51) Int. Cl.
G06F 17/30  (2006.01)
(52) U.S. Cl. ........................................ 705/10
(58) Field of Classification Search .................. 705/10
See application file for complete search history.

(56) References Cited

U.S. PATENT DOCUMENTS 5,911,131 A * 6/1999 Vig ................................ 705/1

6,502,080 B1 * 12/2002 Eichorst et al. .............. 705/400
6,622,129 B1 *  9/2003 Whitworth ................... 705/37

FOREIGN PATENT DOCUMENTS

| EP | 1 001 355 A2 * | 5/2000 |
|---|---|---|
| JP | 8-69503 | 3/1996 |
| JP | 10-143564 | 5/1998 |
| JP | 10-320459 | 12/1998 |
| JP | 11-025158 | 1/1999 |
| JP | 11-85472 | 3/1999 |
| JP | 2000-285372 | 10/2000 |

OTHER PUBLICATIONS

Freund, Rudolf J., and Wilson, William J., Statistical Methods, Revised Edition, Academic Press, New York, 1997.*

(Continued)

*Primary Examiner*—John W. Hayes
*Assistant Examiner*—Nathan H. Erb
(74) *Attorney, Agent, or Firm*—Mattingly, Stanger, Malur & Brundidge, PC

(57) ABSTRACT

A residual value of goods based on data is forecast based on a secondhand price database storing transaction data including the residual value of objects and age of the objects. A standardized forecast residual value is calculated for a prescribed future time based on the standardized residual value. The standardized residual value is calculated by modifying a residual value of the object included in the transaction data stored in the secondhand price database based on attribute values of a prescribed attribute of the object included in the transaction data. A non-standardized forecast residual value is determined by making adjustments corresponding to the attribute values of the object of which the residual value will be forecast.

18 Claims, 10 Drawing Sheets

OTHER PUBLICATIONS

M2 Presswire, "European Leasing Companies Consider E-Strategies to Maintain Residual Values," Mar. 27, 2000.*

Masaaki, Kishima, "Learn Finance with Excel vol. I", pp. 154-189.

Murata, Yoshitoku, "Excel 2000/97 Data Analysis + Calculation Method in Practical Examples", Gijutsu-Hyohron Co., Ltd., Apr. 25, 2000, 1st Ed., pp. 169-172.

* cited by examiner

FIG.2
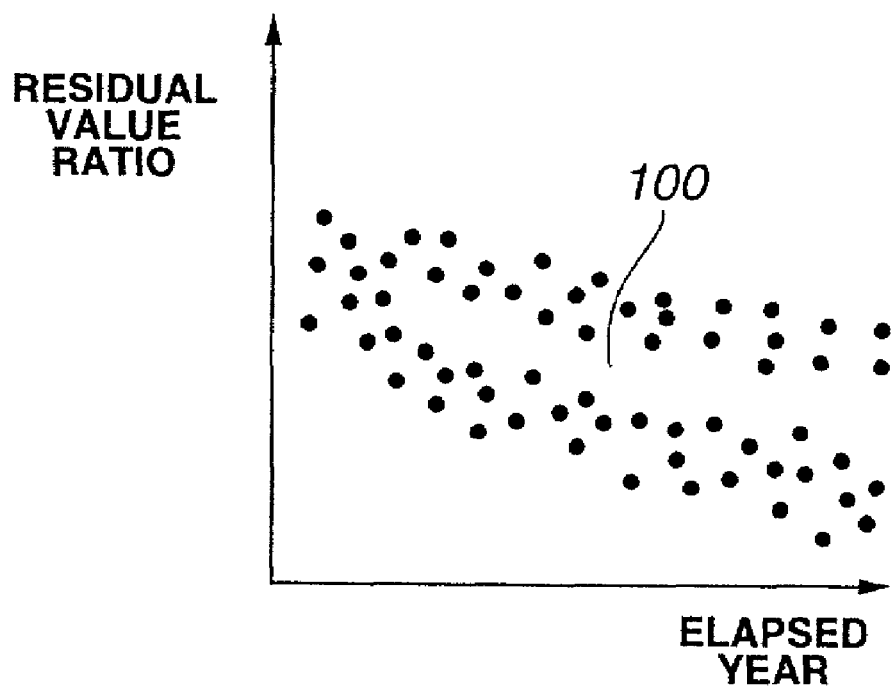
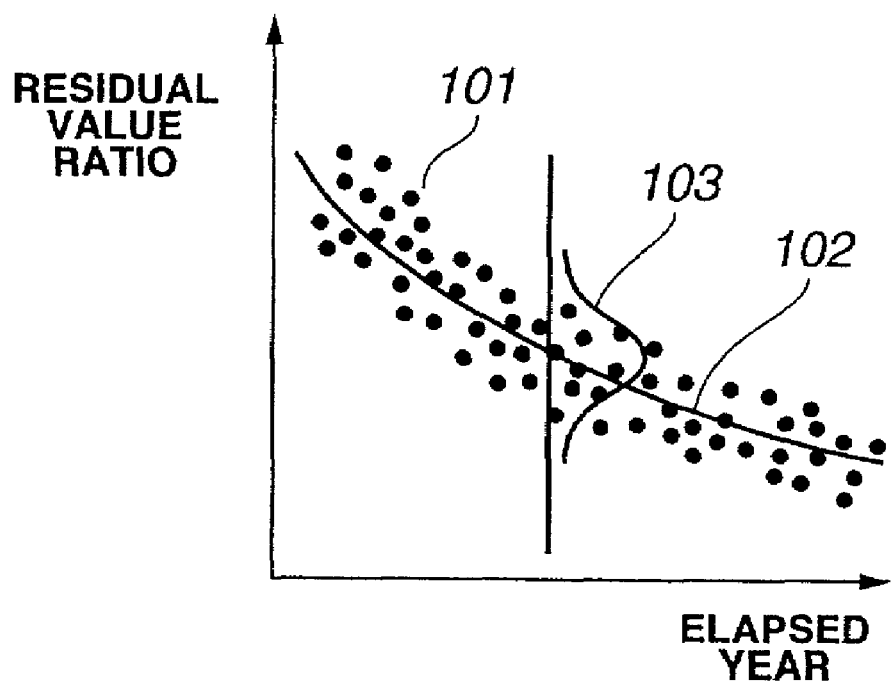

FIG.3

BODY COLOR COMPONENT RATIO

| BLACK | WHITE | RED |
|-------|-------|-----|
| 50%   | 30%   | 20% |

GRADE COMPONENT RATIO

| TOURIST | GRAND | SPORT |
|---------|-------|-------|
| 40%     | 30%   | 30%   |

FIG.4

NON-STANDARDIZED FACTOR FOR BODY COLOR

| BLACK | WHITE | RED |
|-------|-------|-----|
| 1.0   | 1.2   | 0.7 |

NON-STANDARDIZED FACTOR FOR GRADE

| TOURIST | GRAND | SPORT |
|---------|-------|-------|
| −3%     | +5%   | −1%   |

RESIDUAL VALUE FORECASTING SYSTEM AND METHOD THEREOF, INSURANCE PREMIUM CALCULATION SYSTEM AND METHOD THEREOF, AND COMPUTER PROGRAM PRODUCT

BACKGROUND OF THE INVENTION

1. Field of the Invention

The present invention generally relates to technology for forecasting the fluctuation of the residual value for a future object. Particularly, the present invention relates to forecasting technology effective when the object comprises an attribute that is able to incorporate plural attribute values.

2. Description of the Related Art

Conventionally, known is a lease system (including rental systems) whereby goods are borrowed and used instead of being actually purchased. Employing the lease system gives lots of advantage to the user, such as leaving the maintenance and management of the goods to the leasing company and reducing initial costs compared with purchasing the same goods. Nowadays, therefore, the lease system is introduced for a wide variety of goods such as automobiles and heavy machinery.

As for the lease system for automobiles etc., ordinarily adopted is a scheme wherein the residual value of the goods at the end of the lease term is estimated at the beginning of the lease and the lease payment is calculated based on such estimated residual value. A scheme based on such type of estimated residual value may be employed for purposes other than the lease system, such as, determining the amount to be loaned on security against goods or programming automobile insurance, etc.

As for the calculation method of the estimated residual value, known is a depreciation method based on the life term of the goods. There is a fixed rate method and a straight-line method regarding the depreciation method, and, for example, if such goods are automobiles, the estimated residual value (future market value) is calculated according to the following formula:

Fixed rate method: estimated residual
value=acquisition cost×$(1-0.319)^{elapsed\ year}$ Straight-line method: estimated residual
value=acquisition cost−(acquisition cost×$(1-\frac{1}{10})$×0.166×elapsed year)

Here, it is often the case that the estimated residual value set at the beginning of the lease and the actual residual value at the end of the lease term do not agree, and, in case when the actual residual value is less than the estimated residual value, the balance thereof becomes the loss for the leasing company.

Incidentally, as for goods for which the value decreases with time, a scheme of residual value insurance may be proposed as a method for compensating the loss resulting from fluctuations of the residual value of the future goods. Residual value insurance is an insurance product wherein, when the residual value becomes less than the estimated value at a specific point of time in future, in principle, the balance thereof (=estimated value−actual residual value) will be paid as claim payment.

Under the residual value insurance, there may be a case that when simultaneously leasing a plurality of goods, these plurality of goods collectively form a single group, each of which is covered by the residual value insurance. Such group is referred to as a pool. In this case, the residual value insurance is triggered when the total residual value for each pool becomes less than a specific level.

SUMMARY OF THE INVENTION

What is required in fields of lease, finance such as secured loans, insurance etc. is finding not the value for utilizing the goods continuously, but the value for exchange when disposing such goods as secondhand articles. Thus, the forecasting of the future value with an accounting-like system, such as with the depreciation method, is not suitable for the aforementioned purpose and it is impossible to make accurate forecasting. Because of this low level of forecasting accuracy, insurance industry need to evaluate the future value of the goods low in order to avoid poor results.

The first object of the present invention, therefore, is to provide technology for accurately forecasting the residual value of a future object, in the light of such residual value being the exchange value when disposing the object as a secondhand article.

In order to achieve the aforementioned first object, consideration is given to residual value forecasting procedures including (1) collecting transaction data of the goods classified in a same category, (2) extracting the elapsed time and residual value (secondhand price) at the time of transaction from the respective transaction data, (3) approximating the function against the extracted data (elapsed time, residual value), and (4) forecasting the residual value in a prescribed future based on such approximate function. Upon designing a residual value insurance based on the forecasted residual value, a step of (5) designing the residual value insurance based on the forecasted residual value (calculation of insurance premium) is added to the procedures.

With the above-described procedures, in order to improve the forecasting accuracy of the approximate function, it is necessary to set the categories where data representing the similar trend is classified in the same category. Particularly, when the goods has an attribute that may give a large effect to the residual value, it is desirable to set category by each attribute value for such attribute.

However, if the categories are ramified by each attribute value, the decline of the number of transaction data belonging to the same category may cause the considerable deterioration to the reliability of the approximate function.

For example, in the secondhand (used) car market, even if the cars are of the same model, there are cases where the residual value thereof will differ greatly by different attributes such as the color, grade, etc. Accordingly, when an approximate function is sought by setting only the "car model" as the category without considering the color and the grade thereof, an adequate residual value can not be forecasted.

On the other hand, because of the existence of a wide variety of body colors and grades, if categories are set by giving consideration to such body color and grade, only little transaction data may be collected depending on some categories.

Accordingly, the second object of the present invention is to provide technology that, when subject goods have an attribute that may largely affect the residual value thereof, enables an accurate forecast of the residual value, based on data showing similar trend, without making reduction of the number of data caused by ramification on such attribute.

Incidentally, upon guaranteeing the residual value by forming a pool composed of a certain number of goods, component ratio of attributes (ratio of probability of attribute values) within the pool will directly influence the claim payment of the insurance policy. For instance, when pools with the same number of cars are formed, it can be said that the frequency of claim payment for the pool where a large number of the cars have a body color or grade of high residual values and the frequency of claim payment for the pool where a large number of the cars have a body color or grade of low residual values will differ greatly.

Moreover, when the number of goods forming the pools differ, dispersion in component ratio of attributes will also differ. For example, when there is a large number of goods forming a pool, dispersion in component ratio actually measured will be small, and a well-balanced component ratio will be often exhibited. On the other hand, when there is a small number of goods forming a pool, dispersion in component ratio actually measured will be large, and a biased component ratio will be exhibited more often. Thus, if insurance policies are designed by utilizing constantly fixed component ratio regardless of the number of goods forming a pool, this implies that an appropriate insurance policy can not be designed, since no consideration is given to the dispersion in component ratio.

Accordingly, the third object of the present invention is to provide technology that, when a pool is composed of a certain number of goods which have attributes that may largely affect the residual value thereof and when residual value insurance is designed to protect each such pool, enables calculating the premium of the residual value insurance while giving consideration to the component ratio of attributes within the pool as well as the dispersion in component ratio of attributes which depends on the number of goods forming the pool.

In order to achieve the aforementioned objects, the residual value forecasting system of the present invention comprises: a secondhand price database storing a secondhand circulating price or a ratio of the secondhand circulating price to the original price (the secondhand circulating price and the ratio thereof to the original price will be hereinafter collectively referred to as "residual value") of an object, attribute values of the object, and elapsed time of the object; and forecast residual value calculation means which calculates and stores a forecast residual value in a prescribed future based on the corresponding relationship between the residual value and elapsed time stored in the secondhand price database.

Further, the insurance premium calculation system of the present invention is an insurance premium calculation system for calculating the premium of residual value insurance, comprising: standardized forecast residual value calculation means which calculates and stores a residual value in a prescribed future as if the attribute of the object is deemed to be a representative attribute value (to deem to be a representative attribute value will hereinafter be referred to as "to standardize") (such residual value hereinafter to be referred to as "standardized forecast residual value"); and non-standardized forecast residual value calculation means which randomly selects attribute values of the attribute of the object based on the probability of the component ratio of the attribute stored in the storage means ("random selection" here, for example, means a case where a dice is prepared on the basis of a prescribed component ratio, and attribute values are selected according to the number of spots obtained by throwing the dice.), and seeks and stores a non-standardized forecast residual value (hereinafter referred to as "non-standardized forecast residual value) by making adjustments, corresponding to the selected attribute values, to said standardized forecast residual value; and insurance premium calculation means which calculates the insurance premium based on a plurality of said non-standardized forecast residual values.

BRIEF DESCRIPTION OF THE DRAWINGS

FIG. 2 is a diagram for explaining the forecast model function;

FIG. 3 is a diagram for explaining an example of a component ratio;

FIG. 4 is a diagram for explaining an example of non-standardized factor;

DESCRIPTION OF THE PREFERRED EMBODIMENTS

First Embodiment

Figure 1:
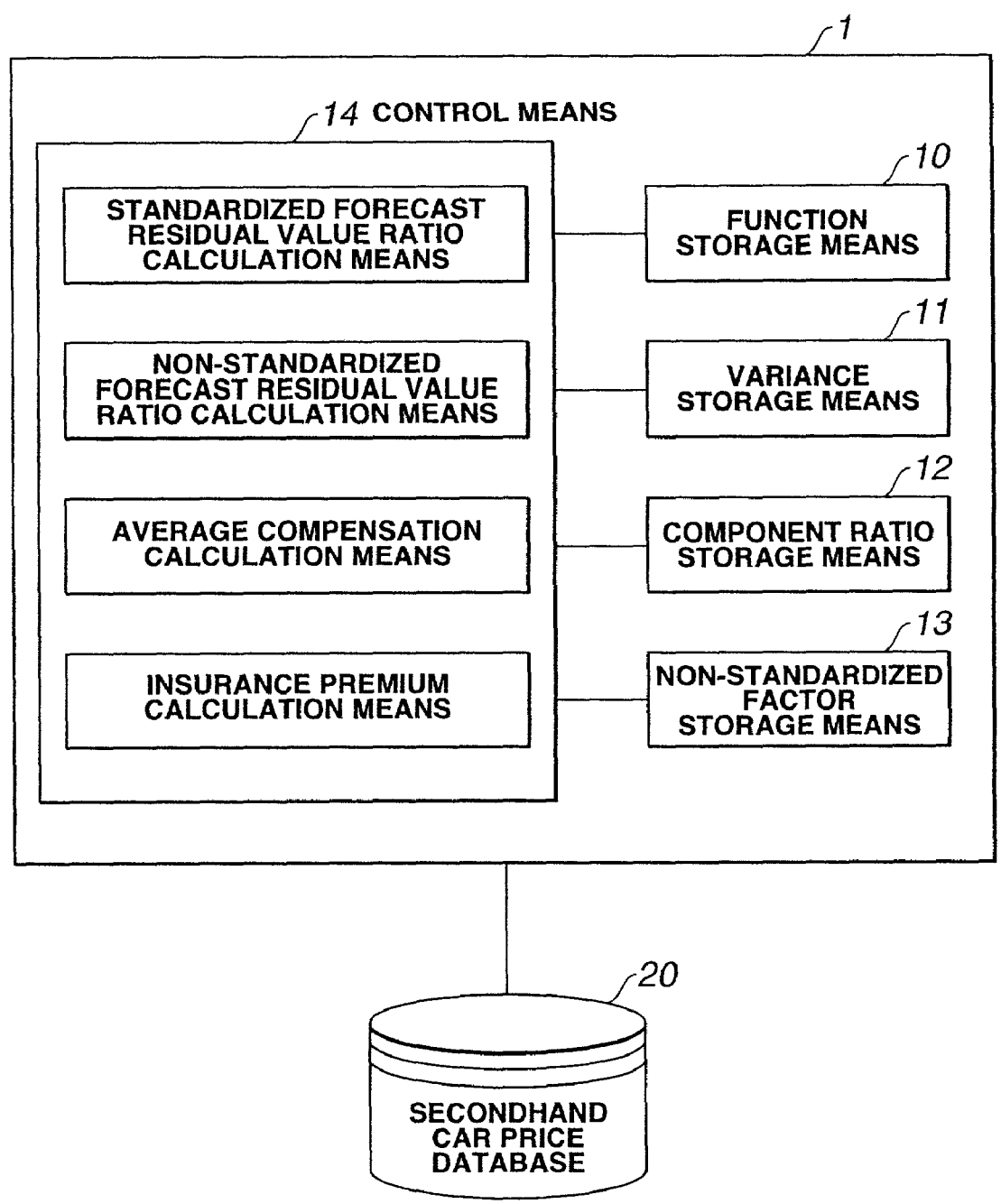
FIG. 1 is a block diagram showing the structure of the insurance premium calculation system according to the first embodiment of the present invention.

Embodiments of the present invention are now described with reference to the drawings. FIG. 1 is a block diagram showing the structure of the insurance premium calculation system according to the first embodiment of the present invention. As shown in FIG. 1, the insurance premium calculation system 1 comprises a function storage means 10, a variance storage means 11, a component ratio storage means 12, a non-standardized factor storage means 13, and a control means 14.

It is sufficient for the insurance designing system according to the present invention herein if it comprises the aforementioned means, and, physically, it may either be a dedicated system for calculating insurance premiums or a multipurpose information processing device. For example, by executing a software program that prescribes the respective steps in the insurance premium calculation method of the present invention in an information processing device having a general structure comprising a processing device, input means, storage means and output means, the insurance premium calculation system of the present invention can be fulfilled. Moreover, the aforementioned dedicated system or information processing device may be structured from a single computer or from a plurality of computers decentralized over the network.

In the present invention, the object of residual value insurance can be designed with any goods. The present embodiment will be hereinafter described taking cars as an example for the object of the residual value insurance.

The function storage means 10 stores a forecast model function based on standardized data regarding the body color and grade per each car model (more specifically, it stores parameters structuring the function).

A forecast model function is a function which, when temporality information (for example, elapsed time since sale as a new car) is as input, outputs the forecast residual value ratio corresponding to the input temporality information. Such function, for instance, can be sought based on the secondhand car price database 20 retaining residual value information.

The secondhand car price database 20 stores a plurality of items of transaction data in a used car market, and the respective transaction data contain at least the respective values of the car model, body color, grade, elapsed time (elapsed year), residual value ratio (or residual value). In other words, the secondhand car price database 20 works as the residual value database.

A secondhand car price and a new car price may be included instead of the residual value ratio. In this case, the control means 14 reads the secondhand car price and the new car price from the secondhand car price database 20 regarding the respective transaction data, seeks the residual value ratio in accordance with (residual value ratio=secondhand car price/new car price), and stores the residual value ratio obtained in the system putting the corresponding relationship with the elapsed time.

By referring to the secondhand car price database 20 and by structuring to seek the forecast model function utilizing the residual value ratio of secondhand cars actually circulating in the actual used car market, it is possible to seek a forecast model function that is capable to forecast the residual value appropriately reflecting the exchange value when disposed as a secondhand article.

The secondhand car price database 20 may be structured to be a part of the insurance premium calculation system 1, or as an external information processing device.

Although the forecast model function may be simply structured to be a function for outputting the mean value of the residual value ratio of transaction data corresponding to the input temporality information herein, the forecasting accuracy may be improved by seeking the forecast model function based on standardized data. The technique to seek a forecast model function based on standardized data is described below.

Firstly, extracted from the secondhand car price database 20 is a data group 100 containing the respective values of the (body color, grade, elapsed time and residual value ratio) regarding the secondhand cars of the same model. Next, standardization is conducted in accordance with the body color and grade of the respective data regarding the data group 100 in order to obtain a standardized data group 101 containing the respective values of the (elapsed time and adjusted residual value ratio). Then, the exponential function, for example, is fitted to the standardized data group 101 in order to seek a forecast model function 102 (cf. FIG. 2). Various algorithms of nonlinear least square method may be employed for the fitting of exponential functions etc.

Herein, "standardization" of data shall mean predetermining a representative attribute value on the attributes of the goods and seeking an adjusted residual value ratio as if the respective data is deemed to be the representative attribute value.

In such standardization, data showing the similar trends in the same category are not collected simply by the ramification of categories by attribute value, but rather data showing the similar trends in the same category are collected as if all data takes the representative attribute value, so that the forecast model function can be sought by utilizing all data of the data group 101 without causing the decline of the number of data by ramification.

It is also possible to structure that the processing to seek the aforementioned forecast model function is executed in the control means 14, and that the obtained forecast model function is stored in the function storage means 10. Herein, the insurance premium calculation system 1 stores the standardized factor that is to be used upon standardization. Such standardized factor is stored each for the respective colors and grades for each car model, and, for example, may be structured as a multiplication coefficient or an addition/subtraction term to the residual value ratio.

If being structured as the multiplication coefficient, standardization is conducted in accordance with the formula of: adjusted residual value ratio=residual value ratio×multiplication coefficient. For example, if the standardized factor is structured as a multiplication coefficient for both the body color and grade, the above formula would become: adjusted residual value ratio=residual value ratio×multiplication coefficient for body color×multiplication coefficient for grade. Meanwhile, if being structured as an addition/subtraction term, standardization is conducted in accordance with the formula of: adjusted residual value ratio=residual value ratio+addition/subtraction term. Whether to employ the multiplication coefficient or addition/subtraction term may be fixed by body color and by grade in accordance with the designing.

As for the said multiplication coefficient, for example, it is possible to calculate and use the (average residual value ratio of the representative body color/average residual value ratio of the respective body colors) and (average residual value ratio of the representative grade/average residual value ratio of the respective grades) for each car model. As for the said addition/subtraction term, it is possible to calculate and use the (average residual value ratio of the representative body color−average residual value ratio of the respective body colors) and (average residual value ratio of the representative grade−average residual value ratio of the respective grades) for each car model. The respective average residual value ratios are calculated based on the respective data of the secondhand car price database 20. Representative body colors and representative grades may be predetermined in accordance with the designing by each car model.

The variance storage means 11 stores the variance (hereinafter referred to as the "forecast model variance") around the forecast model function for each car model.

As shown in FIG. 2, the data group 101 is not completely on the forecast model function 102, and forms a prescribed distribution 103 around the function. The forecast model variance is a variance of the aforementioned distribution, and, for example, may be sought by dividing the residual sum of squares obtained during the process of seeking the forecast model function 102 by the number of data in the data group 101.

The component ratio storage means 12 stores, by each car model, the component ratio for respective body colors employed in that car model and the component ratio for respective grades employed in that car model.

A component ratio can be calculated for example by counting the number of cars of each body color and of each grade in the data group 100 and by seeking the ratio thereof to the total number of data in the data group 100.

The component ratio represented in percentage is shown in FIG. 3. In this example, there are three body colors; namely, black, white and red, with a component ratio of 50%, 30% and 20%. Moreover, there are three types of grades; namely, tourist, grand and sport, with a component ratio of 40%, 30% and 30%.

The non-standardized factor storage means 13 stores non-standardized factor corresponding to the body color and grade by each car model. As described above, since the forecast model function is a function sought based on the standardized data regarding the body colors and grades (standardized model), it does not necessarily agree with the forecast model function sought by ramification by each body color or grade (ramification model). Non-standardized factor is information to adjust gap between such standardized model and ramification model, and, for example, may be structured as the addition/subtraction term or multiplication coefficient to the forecast residual value ratio obtained based on the standardized model.

When structuring the non-standardized factor as an addition/subtraction term, it is possible to use such addition/subtraction term by classifying data in the data group 101 by body color and by grade and calculating, for each data group thus classified, an expected value of (the residual value ratio of the respective data–the output value of the forecast model function when inputting information on the elapsed year of the respective data). Moreover, upon structuring the non-standardized factor as the multiplication coefficient, it is possible to use such multiplication coefficient by calculating, for each data group thus classified, the expected value of (the residual value ratio of the respective data/the output value of the forecast model function when inputting information on the elapsed year of the respective data).

FIG. 4 shows an example of non-standardized factor. In this example, the non-standardized factor is structured as the multiplication coefficient regarding the body color, and, for black, white and red, is 1.0, 1.2 and 0.7, respectively. Moreover, non-standardized factor is structured as the addition/subtraction term regarding the grade, and, for tourist, grand and sport, is −3%, +5% and −1%, respectively. However, whether to make each non-standardized factor an addition/subtraction term or multiplication coefficient may be fixed in accordance with the designing.

In addition, non-standardized factor may be fixed based on standardized factor. For example, when the standardized factor is structured by a multiple coefficient, (1/standardized factor) may be used as the multiple coefficient of the non-standardized factor. Further, when the standardized factor is structured by an addition/subtraction term, (−standardized factor) may be used as the addition/subtraction term of the non-standardized factor.

Although the present embodiment describes a structure where a storage means is respectively provided to the forecast model function, forecast model variance, component ratio and non-standardized factor, since each storage means is of a data structure for storing information by car model, it may also be of a structure wherein the respective information is stored in a single database searchable with the car model being the key. Conventional database technology such as relational databases etc. may be employed for the search/management of data stored in the storage means.

The control means 14 receives various inputs from the user via an input means (not shown); executes standardized forecast residual value ratio calculation processing, non-standardized forecast residual value ratio calculation processing, average compensation calculation processing, and insurance premium calculation processing; and outputs the processing results to the user via an output means (not shown). Upon receiving inputs from the user, for example, it is desirable to display an input screen on a display device and have the user input necessary information by an interactive method.

In FIG. 1, the respective processing steps described above executed in the control means 14 are respectively illustrated as a functional means. The respective processing steps are hereafter explained. Further, each of these processing steps may be executed upon changing the order thereof arbitrarily to the extent that no inconsistencies arise to the contents of the processing.

(Standardized Forecast Residual Value Ratio Calculation Processing)

Figure 5:
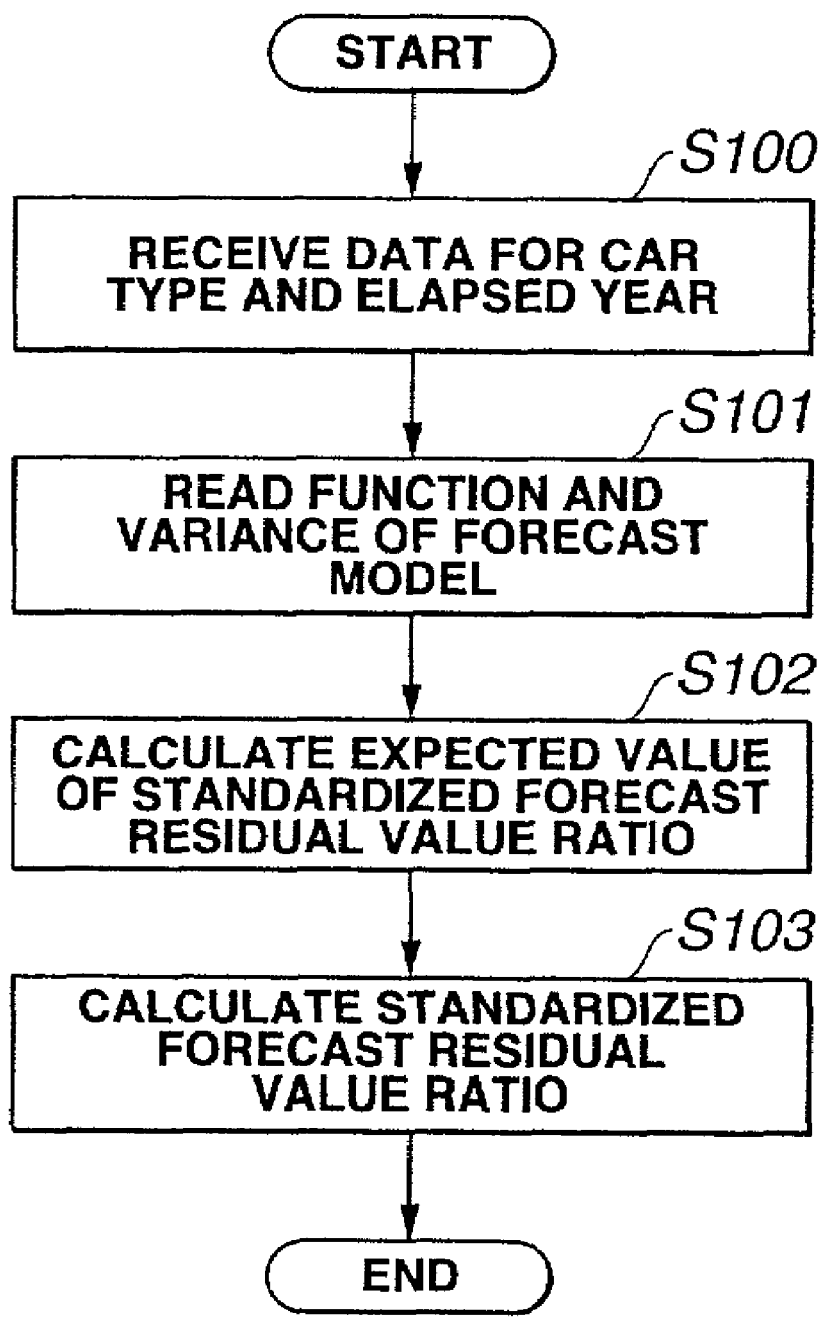
FIG. 5 is a flowchart showing the flow of the standardized forecast residual value ratio calculation processing.

Standardized forecast residual value ratio calculation processing is a process to calculate the standardized forecast residual value ratio regarding the all body colors and all grades in a prescribed future. The standardized forecast residual value ratio calculation processing is hereafter described in detail with reference to the flowchart shown in FIG. 5.

In step S100, the car model and elapsed year are received from the user.

In step S101, the forecast model function corresponding to the received car model is read out by referring to the function storage means 10. Further, the forecast model variance corresponding to the received car model is read out by referring to the variance storage means 11.

In step S102, the output of the said forecast model function read out is calculated with the said received elapsed year as the input and stored as the expected value of the standardized forecast residual value ratio.

In step S103, a sample value according to the normal distribution of (mean value, variance)=(expected value of standardized forecast residual value ratio, said forecast model variance read out) is generated and stored as the standardized forecast residual value. The generation of such sample value may be pursuant to a known numerical calculation library, but may also be generated pursuant to the formula shown below. Firstly, a random number r is generated in range of 0 to 1. Next, x is sought to satisfy the formula below as the sample value.

[Insert Formula]

$$r = \int_{-\infty}^{x} (1/(2\pi \times \text{forecast model variance})^{1/2}$$

$\times \exp(-(x\text{-output value of forecast model function})^2/$
$(2 \times \text{forecast model variance})))$ As described above, the output value of the forecast model function is not used as is, but the sample value is generated in accordance with the normal distribution with the output value as the expected value (mean value) and such sample value is used as the standardized forecast residual value ratio. Thus, it is possible to calculate the standardized forecast residual value ratio taking the variance around the forecast model function into account.

(Non-Standardized Forecast Residual Value Ratio Calculation Processing)

Figure 6:
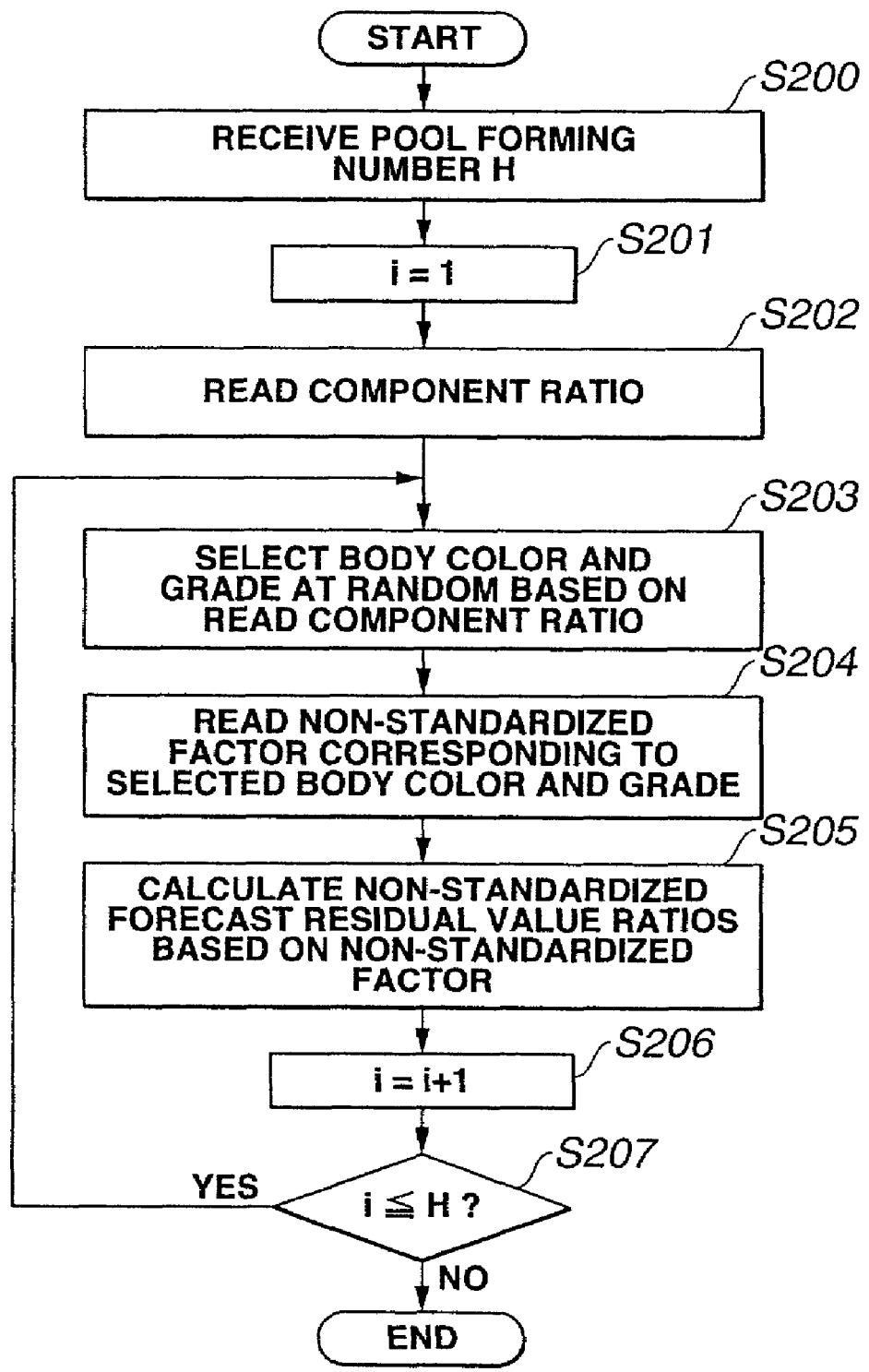
FIG. 6 is a flowchart showing the flow of the non-standardized forecast residual value ratio calculation processing.

Non-standardized forecast residual value ratio calculation processing is a process to randomly select attribute values so that the component ratio of the attribute values within the pool is able to possess dispersion corresponding to the number of objects that forms pool, and to calculate non-standardized forecast residual value ratio by making adjustments to the standardized forecast residual value ratio corresponding to the selected attribute values. "Non-standardization" of the forecast residual value ratio, herein, shall mean seeking the adjusted residual value ratio as if the respective data is deemed to be the respective attribute values, in accordance with the standardized forecast residual value ratio (i.e., forecast residual value ratio obtained based on the standardized model) based on the representative attribute value, contrarily to the standardization process. The non-standardized forecast residual value ratio calculation processing is, hereafter, explained in detail with reference to the flowchart shown in FIG. 6.

In step S200, the number H of cars that forms pool (pool forming number) is received from the user. Further, it is also possible to receive and store the pool forming number in the standardized forecast residual value ratio calculation processing.

In step S201, 1 is set to loop variable i.

In step S202, the component ratio of the body color and grade corresponding to the car model received in the standardized forecast residual value ratio calculation processing is read out by referring to the component ratio storage means 12.

In step S203, the probability of selecting the respective attribute values is set to be the probability corresponding to the component ratio thereof, and the body color and grade are selected pursuant to such probability. In the example shown in FIG. 3, since the component ratio is represented in percentage, such percentage may be used as the probability for selecting the attribute values. This means that, in case of body colors, for example, black is selected at the probability of 50%, white at 30%, and red at 20%. The explanation will be continued under the premise that "white" and "grand" are selected as the body color and grade, respectively.

In step S204, for the said selected car model, the non-standardized factor for the body color and non-standardized factor for the grade are read by referring to the non-standardized factor storage means 13. In the example shown in FIG. 4, 1.2 in the case of "white" body color and +5% in the case of "grand" grade will be read.

In step S205, the standardized forecast residual value ratio calculated in the standardized forecast residual value ratio calculation processing is read out, and the non-standardized forecast residual value ratio is calculated and stored, by making adjustments to such standardized forecast residual value ratio based on each of the said non-standardized factor. For example, if the standardized forecast residual value ratio is 50%, and adjustments are made when the body color is "white" and the grade is "grand", the non-standardized forecast residual value ratio will be as shown below. Whether to adjust the body color or grade in advance can be set in accordance with the designing.

When adjusting the body color in advance: 50%×1.2+5%=65%

When adjusting the grand first: (50%+5%)×1.2=66%

In step S206 1 is added to i.

In step S207, the process returns to step S203 if i H, and, if not, the processing ends.

Since the body color and grade are randomly selected according to the component ratio in the non-standardized forecast residual value ratio calculation processing, the actually measured component ratio of the body colors and grades in the pool are not fixed, and will possess dispersion corresponding to the pool forming number. In other words, dispersion in the component ratio gets small when the pool forming number is large, and dispersion in the component ratio gets large when the pool forming number is small.

Figure 7:
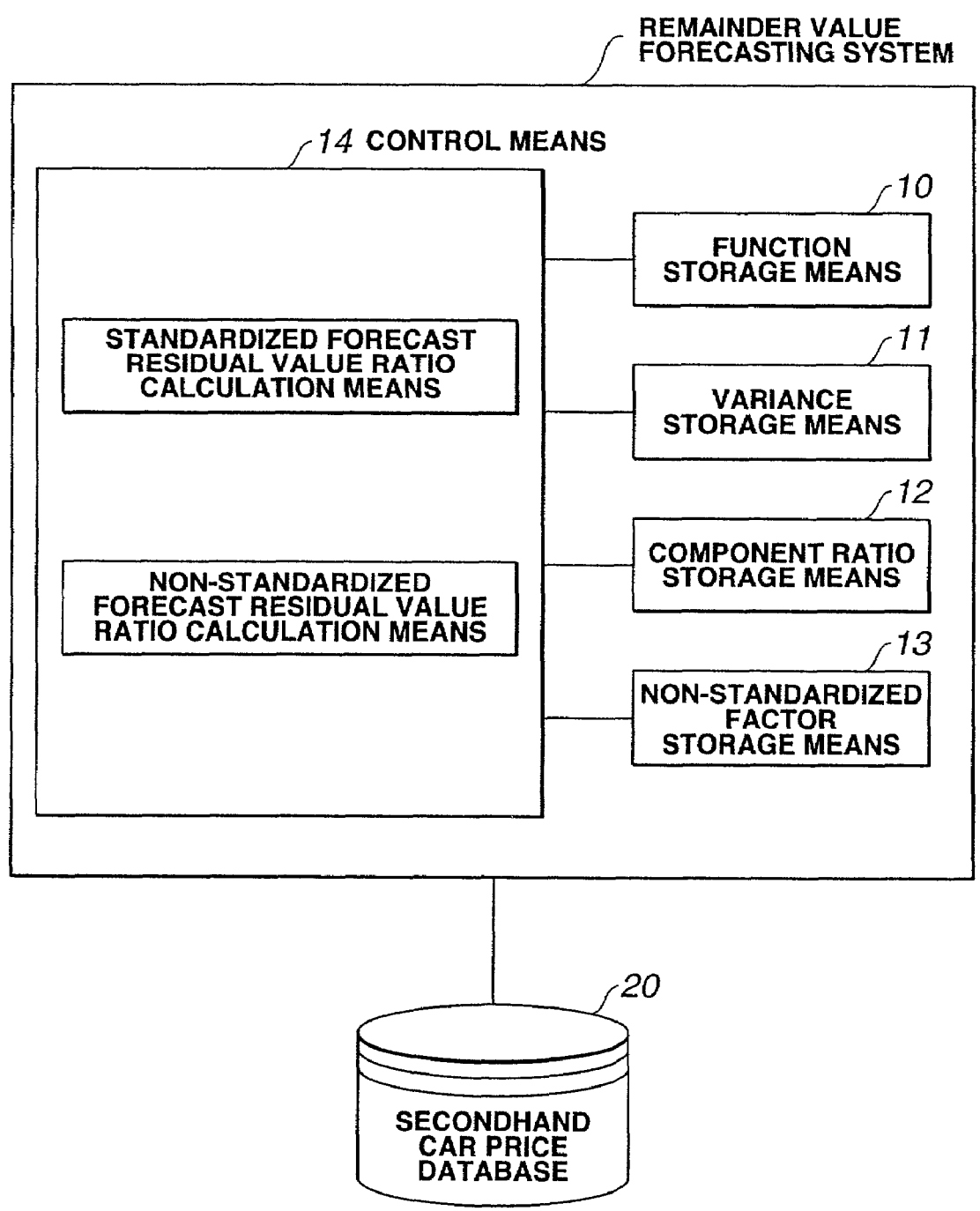
FIG. 7 is a block diagram showing the structure of the residual value forecasting system of the present invention.

Moreover, the configuration of the insurance premium calculation system 1 comprising the function storage means 10, variance storage means 11, component ratio storage means 12, non-standardized factor storage means 13 and control means 14 for executing the standardized forecast residual value ratio calculation processing and non-standardized forecast residual value ratio calculation processing may be used as the residual value forecasting system for implementing the residual value forecasting method according to the present invention (cf. FIG. 7). In addition, the processing for seeking the said forecast model function may be implemented in the said residual value forecasting system. The secondhand car price database 20, herein, may be structured as a part of the residual value forecasting system, or structured as an external information processing device.

(Average Compensation Calculation Processing)

Figure 8:
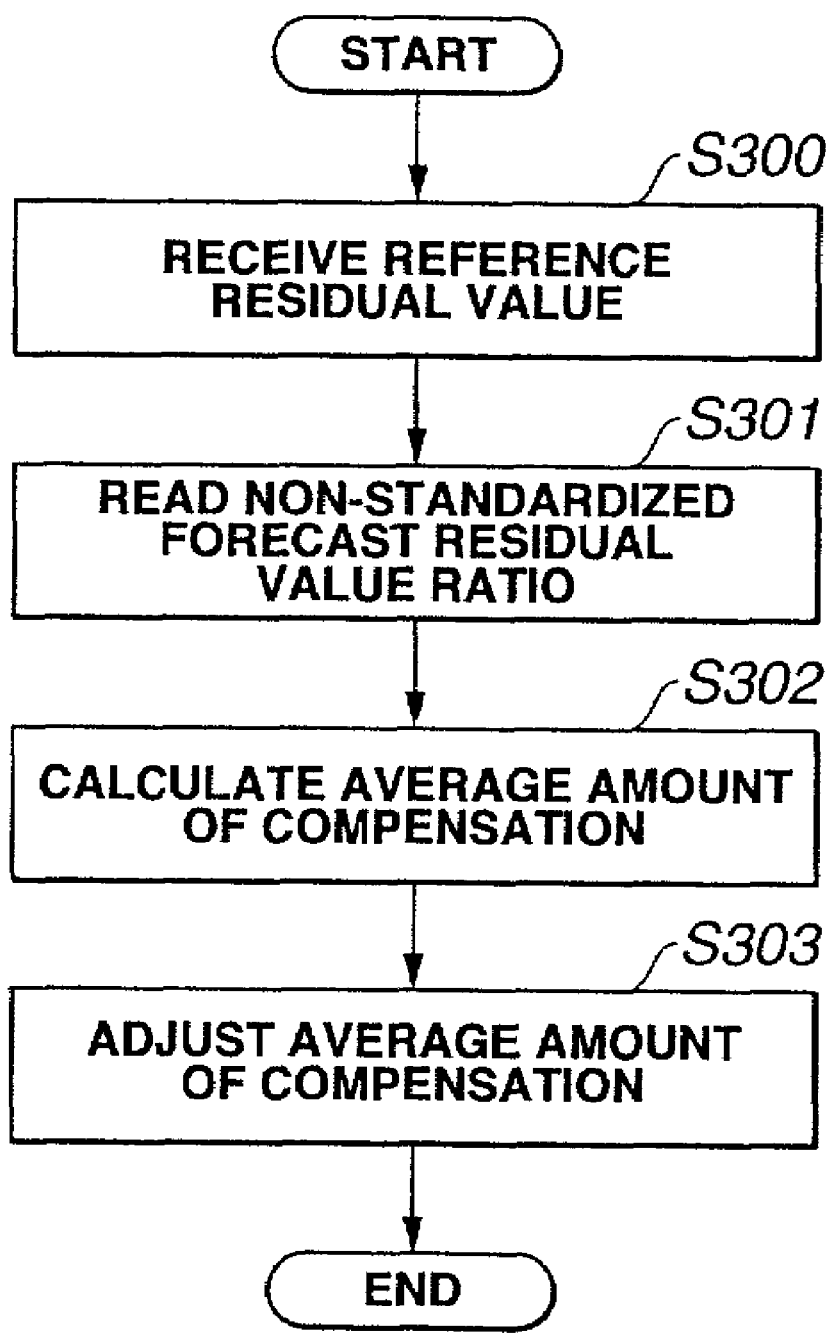
FIG. 8 is a flowchart showing the flow of the average compensation calculation processing.

Average compensation calculation processing is a process to calculate the average amount of compensation by each pool based on a plurality of non-standardized forecast residual value ratios. The amount of compensation, herein, is the amount compensated when the residual value insurance is payable. The average compensation calculation processing is now described in detail with reference to the flowchart shown in FIG. 8.

In step S300, a reference residual value (trigger residual value) is received from the user. A reference residual value is a value showing the level of the residual value insurance being triggered and insurance becomes payable if the residual value is less than the reference residual value. However, as described later, the present embodiment is structured such that the payment of insurance can be determined by each pool.

It is also possible to read the reference residual value which is received and stored in the standardized forecast residual value ratio calculation processing or non-standardized forecast residual value ratio calculation processing.

In step S301, the non-standardized forecast residual value ratios corresponding to the pool forming number calculated in the non-standardized forecast residual value ratio calculation processing are read out.

In step S302, the respective non-standardized forecast residual value ratios read out as aforementioned are subtracted from the received reference residual value and the difference values thereof are calculated. Then, the mean value is calculated based on the difference values corresponding to the pool forming number, and stored as the average amount of compensation. Further, it is also possible to calculate the mean value of the non-standardized forecast residual value ratios and subtracting this from the reference residual value to calculate the average amount of compensation.

In step S303, if the average amount of compensation sought in step S302 is a negative value, the average amount of compensation is altered to 0 since no insurance will be triggered in that case.

In the present embodiment, the average amount of compensation is sought by offsetting the cases where each forecast residual value ratio is larger than and is smaller than the reference residual value within the pool, so that the payment of insurance can be determined by each pool. Further, if H is made to be 1 in FIG. 6, the amount of compensation when the pool forming number is 1; that is, when insuring in single car without forming pools, may be calculated as the average amount of compensation.

(Insurance Premium Calculation Processing)

Insurance premium calculation processing is a process to calculate the insurance premium by a prescribed insurance premium calculation logic based on the average amount of compensation. An insurance premium calculation logic calculates insurance premiums by repeating a plurality of sets (e.g. 10,000 to 100,000 sets) of the standardized forecast residual value ratio calculation processing, non-standardized forecast residual value ratio calculation processing and average compensation calculation processing, and obtaining the average amount of compensation for each set, and making the adjustment for the safety margin ratio for the presumed error and adding the expense ratio and profit margin ratio etc., for example, to the average value of the average amount of compensation per set. As an example, when the safety margin ratio (surcharge ratio) to the average amount of compensation x is y, and the total of expense ratio and profit margin ratio accounting for the overall insurance premium is z, it is possible to calculate the insurance premium with a calculating formula of: insurance premium=x×(1+Y)/(1−z). The calculated insurance premium is presented to the user by text, graphs or voices via an output means.

(Modified Example)

Depending on the goods, the timing of transaction may be a factor affecting the residual value. When the object is a car, for example, various seasonal elements such as the closing date of used car dealers, the seasons for obtaining bonus for consumers, and changing of the year will influence the residual value, and the residual value of cars of the same model (the same body color, the same grade) and same elapsed year may differ depending on the month of transaction. Moreover, if the residual value of a car which transaction was taken place in January had a higher value than a usual residual value, the residual value of a car which transaction takes place in February is often of a high value as well. This tendency shows the positive correlation to past residual values. Thus, in this modified example, the forecast residual value ratio is sought by separating the period of transaction by each month and giving consideration to the influence of the month in which the transaction is to take place.

Figure 9:
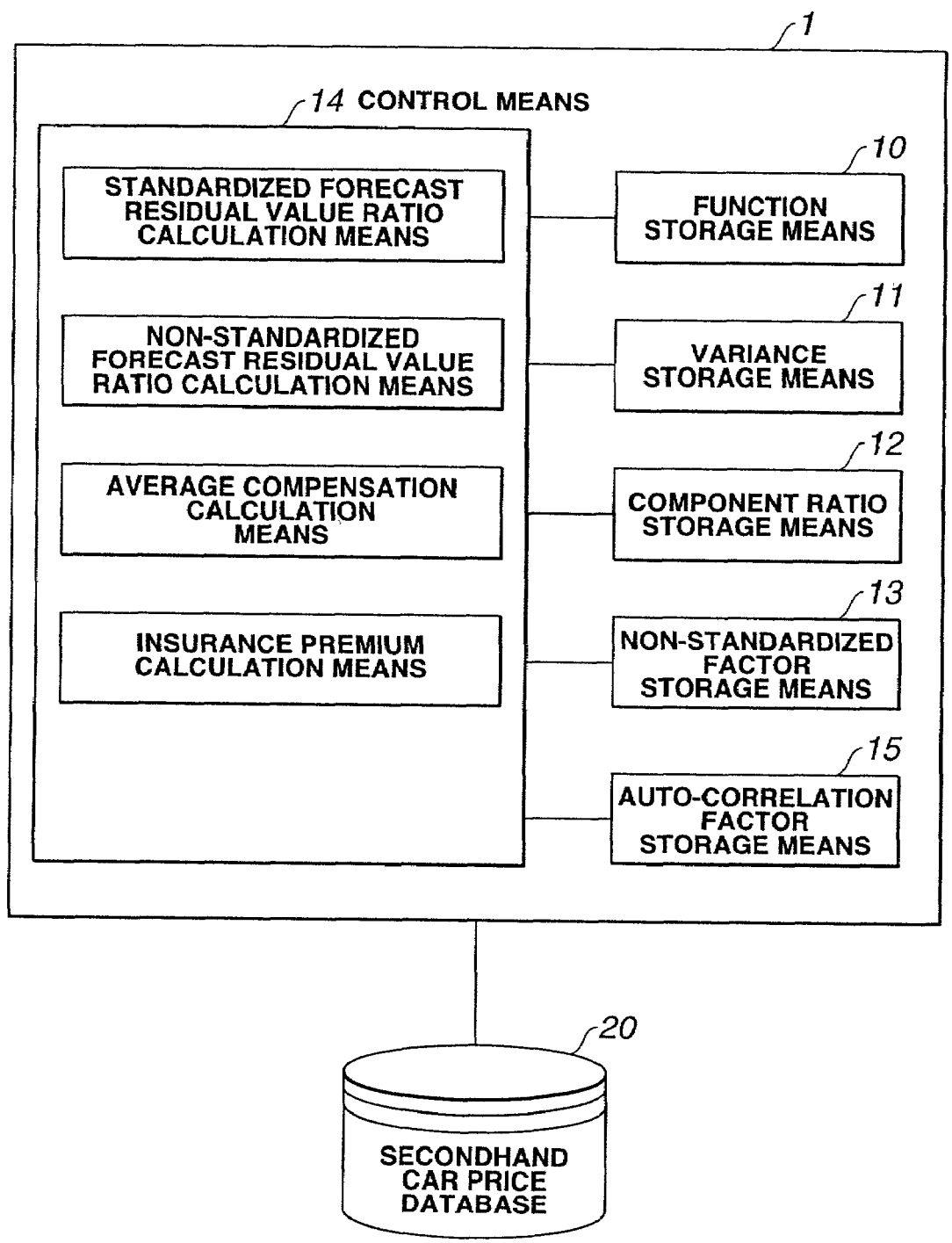
FIG. 9 is a block diagram showing the structure of an illustrated modification of the first embodiment.

As shown in FIG. 9, in addition to the structure of the first embodiment, this modified example further comprises an auto-correlation factor storage means 15. Structures and operations differing from the first embodiment are described below.

Similar to the first embodiment, the function storage means 10 stores the forecast model function based on the standardized data regarding the body color and grade by each car model, which in addition, however, stores parameters for monthly adjustment.

Parameters for monthly adjustment are parameters to reflect the fluctuations of the residual values for each month in relation to the output of the forecast model function, and, for example, may be structured as the multiplication coefficient to the output of the forecast model function.

The forecast model function and parameters for monthly adjustment may be sought, for example, based on the secondhand car price database 20. However, the respective transaction data shall contain at least the values of (car model, body color, grade, elapsed time, residual value ratio, transaction month).

In order to seek the forecast model function and parameters for monthly adjustment, firstly, the data group containing the respective values of (body color, grade, elapsed time, residual value ratio, transaction month) regarding the same secondhand car model is extracted from the secondhand car price database 20. Next, standardization is conducted to such data group in accordance with the body color and grade of the respective data in order to obtain a standardized data group containing the respective values of the (elapsed time, adjusted residual value ratio, $X_1, \ldots, X_{12}$). $X_1, \ldots, X_{12}$, herein, is a dummy variable corresponding to January through December, and only the dummy variable falling under the transaction month is set to take 1, and set to take 0 in other cases.

Then, for example, an exponential function $\alpha \times \exp(-\beta \times \text{elapsed time})/(S_1 \times X_1 + S_2 \times X_2 + \ldots + S_{12} \times X_{12})$ is fitted to the standardized data group. $(\alpha, \beta)$ are the parameters structuring the forecast model function, and $S_1, \ldots, S_{12}$ are the parameters for monthly adjustment. For the fitting of the exponential function, various algorithms of nonlinear least square method can be used. Upon fitting with a least square method, it may be necessary to introduce a restriction, for example, $S_1 + S_2 + \ldots + S_{12} = 12$.

The auto-correlation factor storage means 15 stores, for each car model, an auto-correlation parameter $\rho(0 \leq \rho \leq 1)$ which shows the degree of correlation of the difference between the standardized forecast residual value ratio for the previous month and the expected value of the standardized forecast residual value ratio for such previous month, and the difference between the standardized forecast residual value ratio for the current month and the expected value of the standardized forecast residual value ratio for the current month. Further, ρ may be structured to show the degree of the correlation of such differences for the past several months, and such difference for the current month.

Figure 10:
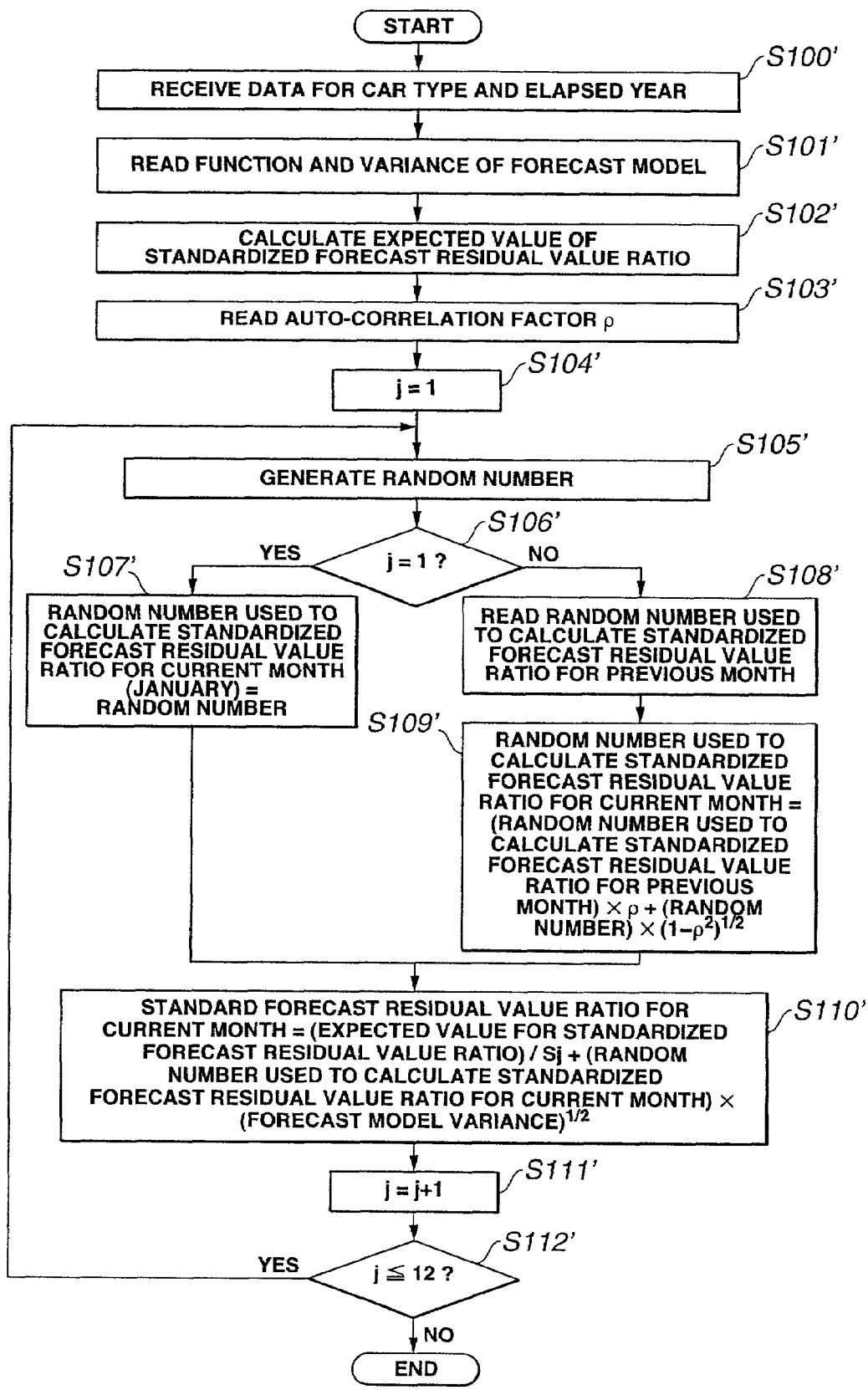
FIG. 10 is a flowchart showing the flow of the standardized forecast residual value ratio calculation processing in the illustrated modification.
Figure 11:
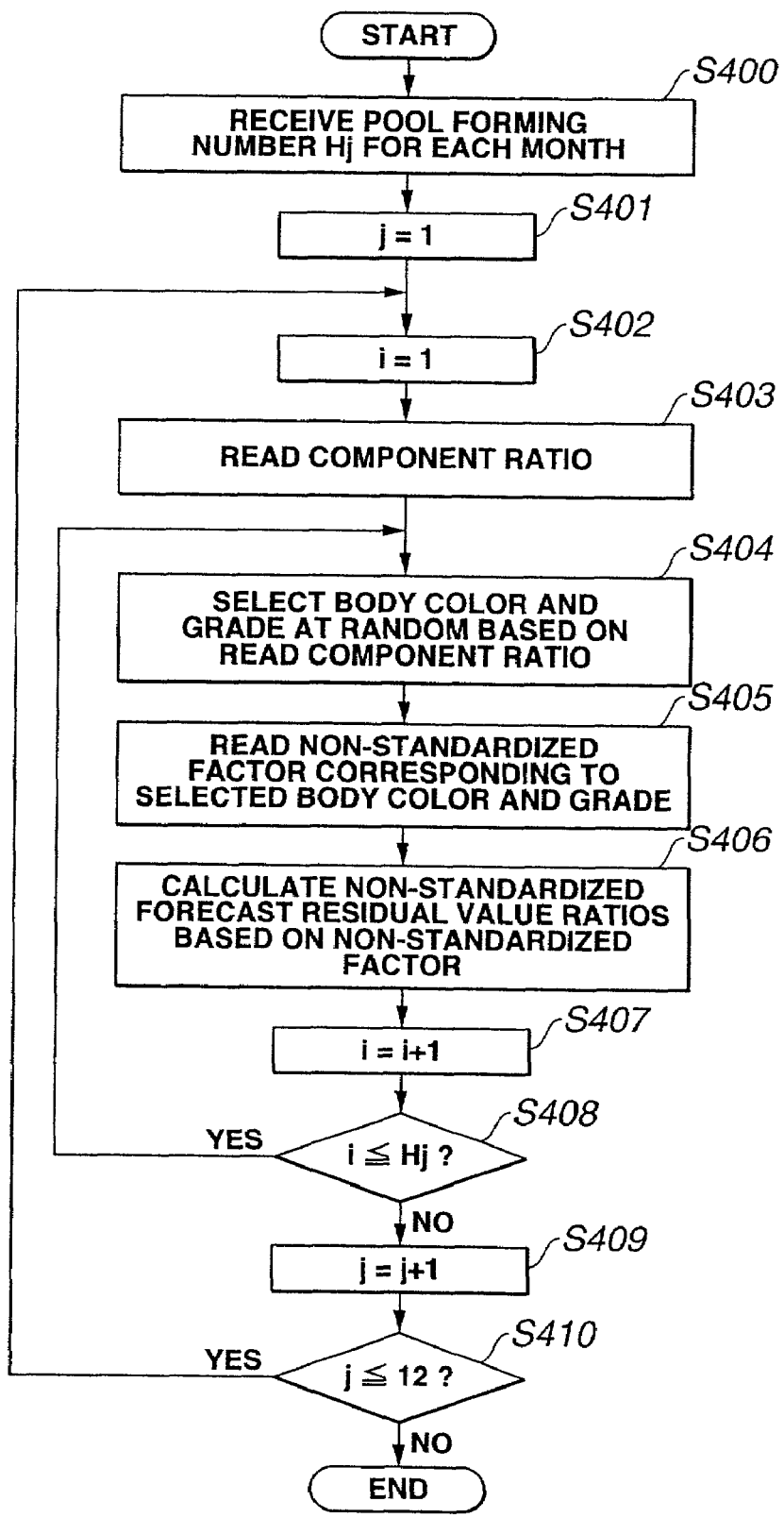
FIG. 11 is a flowchart showing the flow of the non-standardized forecast residual value ratio calculation processing in the illustrated modification.

The respective processing steps conducted in the control means 14 is in principle the same as those in the first embodiment, but is modified and executed as shown in the flowchart of FIG. 10 for the standardized forecast residual value calculation processing and as shown in the flowchart of FIG. 11 for the non-standardized forecast residual value calculation processing. Moreover, in the average compensation calculation processing, the non-standardized forecast residual value ratios from January through December are read out and the average amount of compensation is calculated thereby.

(Standardized Forecast Residual Value Ratio Calculation Processing)

Steps S100 to S102' are the same as the first embodiment S100 to S102.

In step S103', the auto-correlation parameter ρ corresponding to the received car model is read out by referring to the auto-correlation factor storage means 15.

In step S104', 1 is set to the month parameter j.

In step S105', random numbers are generated in accordance with the normal distribution of (mean value, variance) =(0, 1).

In step S106', the process proceeds to step S107', when j=1, and otherwise proceeds to step S108'.

In step S107', the said generated random numbers are stored as the random numbers used to calculate standardized forecast residual value ratio, and the process proceeds to step S ilo.

In step S108', the random number used to calculate standardized forecast residual value ratio of the previous month (month represented as (j−1)) are read out.

In step S109', the random number used to calculate standardized forecast residual value ratio for the current month (month represented as j) is calculated based on the said auto-correlation parameter ρ read out in relation to the generated random number and the said random number used to calculate standardized forecast residual value ratio for the previous month read out. The random number used to calculate standardized forecast residual value ratio for the current month, herein, may be calculated by employing, for example, the following formula:

Random number used to calculate standardized forecast residual value ratio for the current month= (random number used to calculate standardized forecast residual value ratio for the previous month)×ρ+(generated random number)×$(1-ρ^2)^{1/2}$ In step S110', a parameter for monthly adjustment $S_j$ is read out by referring to the function storage means 10. Then, the standardized forecast residual value ratio for the current month (month represented as j) is calculated and stored based on the expected value of the standardized forecast residual value ratio, the said forecast model variance read out and the random number used to calculate standardized forecast residual value ratio for the current month. For example, the following formula may be employed, herein, for the calculation for the standardized forecast residual value ratio for the current month.

Standardized forecast residual value ratio for current month=(expected value of standardized forecast residual value ratio)/$S_j$+(random number used to calculate standardized forecast residual value ratio for current month)×(forecast model variance)$^{1/2}$ According to the formulas in step S109∝ and step S110', the closer ρ gets to 1, the closer random number used to calculate standardized forecast residual value ratio for current month gets to the random number used to calculate standardized forecast residual value ratio for previous month. Thus, by adjusting the value of ρ, it is possible to calculate the standardized forecast residual value ratio for the current month by correlating the trend for the residual value ratio for the previous month with that for the current month (e.g. the trend of being a higher value or lower value than the expected value of the standardized forecast residual value ratio).

In step S111', 1 is added to j.

In step S112', the process returns to step S105' when $j \leq 12$, and otherwise ends the processing.

(Non-Standardized Forecast Residual Value Ratio Calculation Processing)

In step S400, the pool forming number for each month $H_j$ (j represents the month) is received from the user. Moreover, the said received pool forming number may differ by each month; for example, 100 units for January, 150 for February, etc.

In the case when the ratio of the pool forming number for each month (month ratio) is obtained, herein, it is possible to set the pool forming number $H^j$ for each month, by receiving the annual pool forming number from the user and distributing this number to the respective months based on the said month ratio. In such a case, similar to the body color and grade, it is possible to set the probability for selecting the month as a probability corresponding to the said month ratio, and to select a month in accordance with such probability.

In step S401, 1 is set to the month parameter j.

In step S402, 1 is set to the loop variable i.

In step S403, the component ratio of the body color and grade corresponding to each car model received in the standardized forecast residual value ratio calculation processing is read out by referring to the component ratio storage means 12.

In step S404, the probability of selecting the respective attribute values is set to be a probability corresponding to the component ratio, and the body color and grade are selected in accordance with such probability.

In step S405, the non-standardized factor for the body color and the non-standardized factor for the grade regarding the said received car model are read out by referring to the non-standardized factor storage means 13.

In step S406, the standardized forecast residual value ratio corresponding to the current month (month represented as j) calculated in the standardized forecast residual value ratio calculation processing is read out, and the non-standardized forecast residual value ratio is calculated and stored, by making adjustments, to such standardized forecast residual value ratio, based on the said respective non-standardized factor read out.

In step S407 1 is added to i.

In step S408, the process returns to step S404 if $i \leq H_j$, and otherwise proceeds to step S409.

In step S409, 1 is added to j.

In step S410, the process returns to step S402 if $j \leq 12$, and otherwise ends the processing.

According to the structure of the present modified example, it is possible to calculate the forecast residual value ratio for each month by adjusting the influence based on differences in the transaction months and in consideration of the correlation with that of the previous month. It is thereby possible to calculate an insurance premium reflecting the fluctuation of the residual value resulting from seasonal differences by calculating the average amount of compensation pursuant to the forecast residual value ratio for each month.

Second Embodiment

The second embodiment of the present invention is described hereafter. The second embodiment comprises a recording medium storing the insurance premium calculation program or the residual value forecasting program. This recording medium may be a CD-ROM, magnetic disk, semiconductor memory or other recording medium, and also includes cases of circulation via the network.

The insurance premium calculation program is read into the data processing device from the recording medium, and controls the operation of the data processing device. Pursuant to the control of the insurance premium calculation program, the data processing device executes the standardized forecast residual value ratio calculation processing, non-standardized forecast residual value ratio calculation processing, average compensation calculation processing, insurance premium calculation processing etc. In other words, the data processing device executes the same processing steps as those of the insurance premium calculation system shown in FIG. 1 or FIG. 9.

The residual value forecasting program is read into the data processing device from the recording medium, and controls the operation of the data processing device. Pursuant to the control of the residual value forecasting program, the data processing device executes the standardized forecast residual value ratio calculation processing, non-standardized forecast residual value ratio calculation processing etc. In other words, the data processing device executes the same processing steps as those of the residual value forecasting system shown in FIG. 7. Moreover, it is also possible to make it execute the processing to seek the forecast model function.

(Others)

The present invention is not limited to the foregoing embodiments, and may be variously modified and employed. For example, the residual value ratio may be converted to a residual value based on the relationship of residual value=initial price×residual value ratio. Thus, in the aforementioned embodiment, it is possible to similarly execute the present invention even when replacing the "forecast residual value ratio" with a "forecast residual value".

In addition, although a normal distribution is employed as the distribution to generate the sample value in the foregoing embodiments, it is possible to employ a distribution other than the normal distribution to generate the sample value, if the distribution can be presumed from the past data. For example, it would be possible to use a log-normal distribution etc., or apply the actual past error distributions with a bootstrap method.

Further, the residual value forecasting method and residual value forecasting system of the present invention may be employed in a wide variety of information processing methods and information processing systems which utilizes forecast residual values; for example, calculation methods and calculation systems for lease payment rates utilizing forecast residual values; calculation methods and calculation systems for security values for secured loan on automobiles etc.; and insurance designing methods and designing systems for automobile insurance policies etc.; and so on.

The present invention forecasts the secondhand price (residual value) of the goods in the future by referring to the circulating price, at the present time, in the secondhand market regarding the similar goods sold previously. This process makes it recognize the exchange value when disposed as a secondhand article in the future, and makes it possible to provide much accurate forecasting than conventional depreciation methods.

Moreover, in the present invention, because data having the similar trend are collected in the same category by standardization, that is, by deeming that the data will take the representative attribute value, a residual value can be forecasted accurately based on the data showing the similar trend, without making reduction of the number of data caused by ramification.

In addition, in the present invention, because the attribute values are selected randomly based on the probability of component ratio of the attributes, when a pool is composed of a certain number of goods and a residual value insurance is designed for each such pool, it is possible to calculate the premium of the residual value insurance by giving consideration to the component ratio of attribute values in the pool as well as to the dispersion in the component ratio which depends on the number of goods forming the pool.

The entire disclosure of Japanese Patent Application No. 2000-332475 filed on Oct. 31, 2000 including specification, claims, drawings and summary are incorporated herein by reference in its entirety.

What is claimed is:

1. A residual value forecasting system, comprising: a secondhand price database device configured to store transaction data including a residual value that represents one of a secondhand circulating price that is less than an original price and a ratio of the secondhand circulating price to the original price of an object, attribute values of the object, and elapsed time of the object since an initial time that corresponds to the original price; processor configured for adjusting the residual value of the object included in the transaction data stored in said secondhand price database, based on an attribute value of a prescribed attribute of the object included in said transaction data, calculating a standardized residual value as if the attribute of the object is deemed to be a representative attribute value, and calculating a standardized forecast residual value in a prescribed future based on said standardized residual value and the elapsed time included in said transaction data, and calculating a non-standardized forecast residual value in the prescribed future by making adjustment, corresponding to the attribute value of the object of which residual value will be forecasted, to said standardized forecast residual value, wherein said calculating said standardized forecast residual value comprises: storing a standardized factor for each attribute value regarding the attributes of the object, wherein said standardized factor is structured as a multiplication coefficient or an add/subtract term to the residual value; a calculating standardized residual value by adjusting the residual value of the object included in the transaction data stored in said secondhand price database, based on the stored standardized factors corresponding to attribute values of the prescribed attribute of the object included in said transaction data; seeking a forecast function to calculate the expected value of the standardized forecast residual value based on said standardized residual value and the elapsed time included in said transaction data, wherein an exponential function is applied to said forecast function; and calculating the expected value of the standardized forecast residual value in the prescribed future, based on said forecast function.

2. The residual value forecasting system according to claim 1, wherein a non-linear least-square algorithm is employed for the application of the exponential function.

3. The residual value forecasting system according to claim 1, wherein said object is a car.

4. The residual value forecasting system according to claim 3, wherein said attribute is at least either a body color or a grade.

5. The residual value forecasting system according to claim 1, wherein said calculating said non-standardized forecast residual value further comprises randomly selecting the attribute value for the attribute of the object based on the component ratio of the attributes, and calculating the non-standardized forecast residual value by making adjustment, corresponding to the selected attribute value, to said standardized forecast residual value.

6. The residual value forecasting system according to claim 1, wherein said calculating said standardized forecast residual value further comprises: seeking variance around said forecast function based on said standardized residual value; and generating a sample value based on a distribution as follows: (mean value, variance)=(expected value calculated as aforementioned, variance sought as aforementioned) as the standardized forecast residual value.

7. A residual value forecasting method, comprising: storing in a secondhand price database transaction data including a residual value that represents one of a secondhand circulating price that is less than an original price and a ratio of the secondhand circulating price to the original price of an object, attribute values of the object, and elapsed time of the object since an initial time that corresponds to the original price; calculating a standardized forecast residual value by adjusting the residual value of the object included in the transaction data stored in said secondhand price database, based on an attribute value of a prescribed attribute of the object included in said transaction data, calculating a standardized residual value as if the attribute of the object is deemed to be a representative attribute value, and calculating the standardized forecast residual value in a prescribed future based on said standardized residual value and the elapsed time included in said transaction data; and calculating a non-standardized forecast residual value by seeking the non-standardized forecast residual value in the prescribed future by making adjustment, corresponding to the attribute value of the object of which residual value will be forecasted, to said standardized forecast residual value, wherein said calculating said standardized forecast residual value comprises: storing a standardized factor for each attribute value regarding the attributes of the object, wherein said standardized factor is structured as a multiplication coefficient or an add/subtract term to the residual value; calculating the standardized residual value in which the residual value of the object included in the transaction data stored in said secondhand price database is adjusted, based on the stored standardized factors corresponding to attribute values of the prescribed attribute of the object included in said transaction data; wherein a forecast function to calculate the expected value of the standardized forecast residual value is sought based on said standardized residual value and the elapsed time included in said transaction data, and an exponential function is applied to said forecast function; and wherein the expected value of the standardized forecast residual value in the prescribed future is calculated, based on said forecast function.

8. The residual value forecasting method according to claim 7, wherein a non-linear least-square algorithm is employed for the application of the exponential function.

9. The residual value forecasting method according to claim 7, wherein said object is a car.

10. The residual value forecasting method according to claim 9, wherein said attribute is at least either a body color or a grade.

11. The residual value forecasting method according to claim 7, further including in said calculating of said non-standardized forecast residual value, randomly selecting the attribute value for the attribute of the object based on the component ratio of the attributes, and seeking the non-standardized forecast residual value by making adjustment, corresponding to the selected attribute value, to said standardized forecast residual value.

12. The residual value forecasting method according to claim 7, wherein said calculating said standardized forecast residual value further comprises: seeking variance around said forecast function based on said standardized residual value; and generating a sample value based on a distribution as follows: (mean value, variance)=(expected value calculated as aforementioned, variance sought as aforementioned) as the standardized forecast residual value.

13. A computer program product comprising: a computer-readable storage medium encoded with a computer-readable program for causing a computer to perform a residual value forecasting method, comprising: storing in a secondhand price database transaction data including a residual value that represents one of a secondhand circulating price that is less than an original price and a ratio of the secondhand circulating price to the original price of an object, attribute values of the object, and elapsed time of the object since an initial time that corresponds to the original price; calculating a standardized forecast residual value by adjusting the residual value of the object included in the transaction data stored in said secondhand price database, based on an attribute value of a prescribed attribute of the object included in said transaction data, calculating a standardized residual value as if the attribute of the object is deemed to be a representative attribute value, and calculating the standardized forecast residual value in a prescribed future based on said standardized residual value and the elapsed time included in said transaction data; and calculating a non-standardized forecast residual value by seeking the non-standardized forecast residual value in the prescribed future by making adjustment, corresponding to the attribute value of the object of which residual value will be forecasted, to said standardized forecast residual value, wherein said calculating said standardized forecast residual value comprises: storing a standardized factor for each attribute value regarding the attributes of the object, wherein said standardized factor is structured as a multiplication coefficient or an add/subtract term to the residual value; calculating the standardized residual value in which the residual value of the object included in the transaction data stored in said secondhand price database is adjusted, based on the stored standardized factors corresponding to attribute values of the prescribed attribute of the object included in said transaction data; wherein a forecast function to calculate the expected value of the standardized forecast residual value is sought based on said standardized residual value and the elapsed time included in said transaction data, and an exponential function is applied to said forecast function; and wherein the expected value of the standardized forecast residual value in the prescribed future is calculated, based on said forecast function.

14. The computer program product according to claim 13, wherein a non-linear least-square algorithm is employed for the application of the exponential function.

15. The computer program product according to claim 13, wherein said object is a car.

16. The computer program product according to claim 15, wherein said attribute is at least either a body color or a grade.

17. The computer program product according to claim 13, wherein said calculating of said non-standardized forecast residual value further comprises randomly selecting the attribute value for the attribute of the object based on the component ratio of the attributes, and seeking the non-standardized forecast residual value by making adjustment, corresponding to the selected attribute value, to said standardized forecast residual value.

18. The computer program product according to claim 13, wherein said calculating said standardized forecast residual value further comprises: seeking variance around said forecast function based on said standardized residual value; and generating a sample value based on a distribution as follows: (mean value, variance)=(expected value calculated as aforementioned, variance sought as aforementioned) as the standardized forecast residual value.

* * * * *